April 9, 1957 D. S. STEINBERG ET AL 2,788,093
GUIDE HANDLE BRAKE CONTROL FOR LIFT TRUCKS
Filed Dec. 28, 1953 4 Sheets-Sheet 2

INVENTORS.
DAVID S. STEINBERG
HAROLD A. KUSNETZ
BY
Kenneth C. Witt
ATTY.

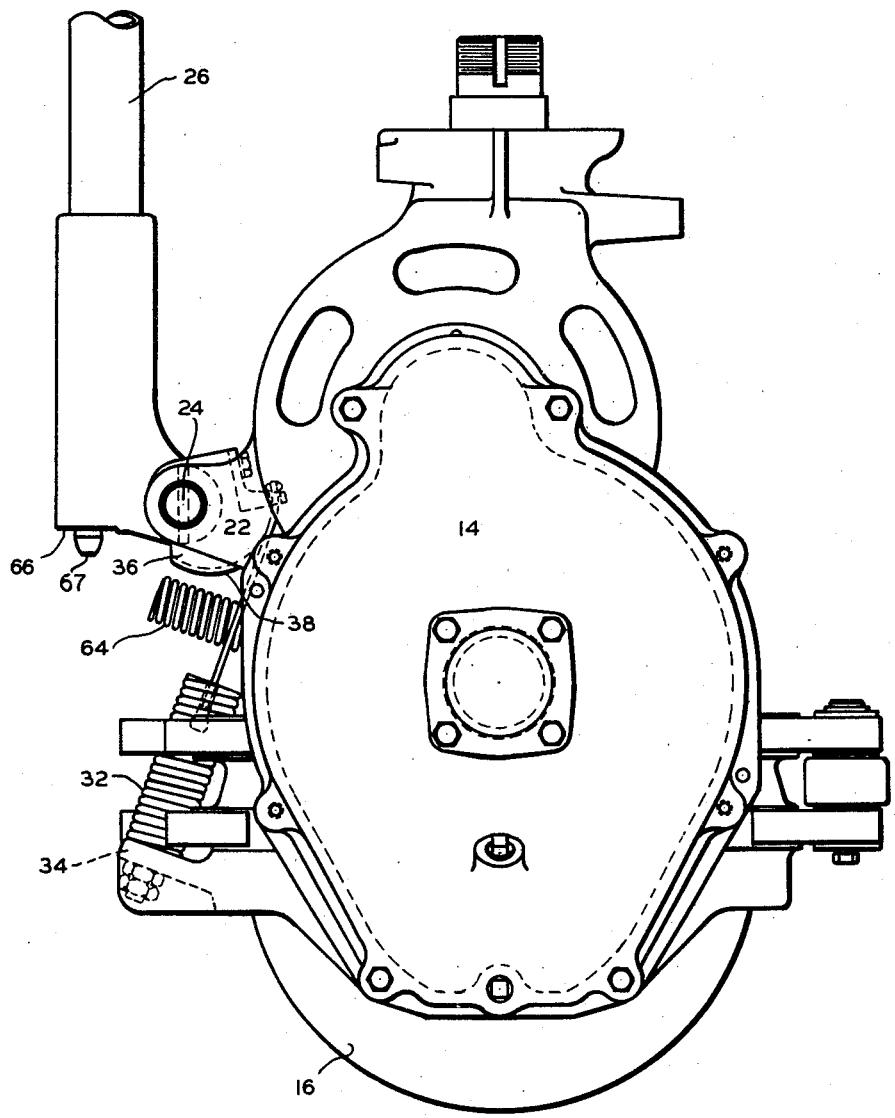

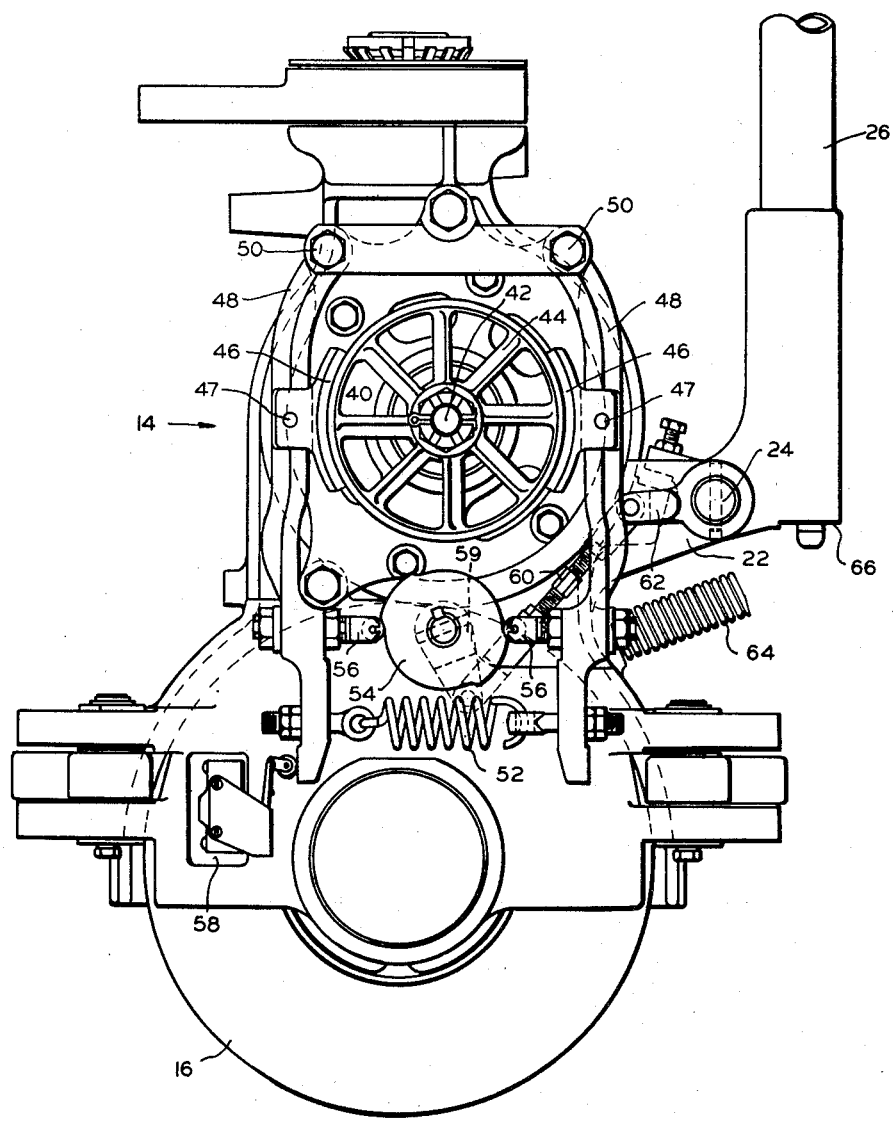

United States Patent Office 2,788,093
Patented Apr. 9, 1957

2,788,093

GUIDE HANDLE BRAKE CONTROL FOR LIFT TRUCKS

David S. Steinberg and Harold A. Kusnetz, Detroit, Mich., assignors to Clark Equipment Company, a corporation of Michigan Application December 28, 1953, Serial No. 400,615

3 Claims. (Cl. 188—119)

Our present invention relates generally to powered hand lift trucks, and, more specifically, to steering handle positioning means for such hand lift trucks.

One general type of presently known hand lift truck comprises a truck body and a drive head rotatably mounted about a vertical axis near one end of the truck body. In this form of truck, a steering handle is mounted to the drive head for effecting rotary movement of the latter and the handle is swingable in a vertical plane. The handle may have connection through suitable linkage means with the vehicle brake means for applying the latter when the handle is disposed in either a vertical or a horizontal position. This arrangement is oftentimes referred to as a "dead-man" control.

It is an object of our present invention to provide primary means for biasing the steering handle toward a vertical position which means is so arranged as to exert a substantially uniform biasing force on the handle irrespective of the position of the latter in the plane of swinging movement.

It is another object of our present invention to provide supplementary means which will become operable when the handle is horizontal for cooperating with the primary biasing means in initially biasing the handle away from the horizontal while interrupting the hold of the brake means.

In the accomplishment of the foregoing objects, we mount cam means for pivotal movement with the handle on the pivotal axis thereof and connect resilient means between the truck drive head and the cam means for biasing the handle to a vertical position. The connection between the resilient means and the cam means is arranged so that the axis of the resilient means moves toward the pivotal axis of the handle as the latter is swung away from the vertical and the cam means is pivoted. Thus, as the force exerted by the resilient means increases, the lever arm, through which such force acts, decreases, and a substantially uniform biasing force is maintained on the handle irrespective of the position of the latter in the plane of swinging movement.

In order to interrupt the hold of the truck brake means after the latter has been applied by the handle being disposed horizontally, additional resilient means is secured to the truck drive head and has a free end which is engageable by the handle when the latter is disposed horizontally. This last described resilient means, together with the first named resilient means, serves to initially bias the handle away from the horizontal, after which the first named resilient means completes return of the handle to a vertical position.

Now in order to acquaint those skilled in the art with the manner of constructing and using handle constructions in accordance with the principles of our present invention, we shall describe in connection with the accompanying drawings a preferred embodiment of our present invention.

In the drawings:

Figure 3 is an enlarged side elevational view of the drive head of the hand lift truck of Figure 1; and Figure 4 is an enlarged side elevational view of the opposite side of the drive head from that shown in Figure 3.

Figure 2:
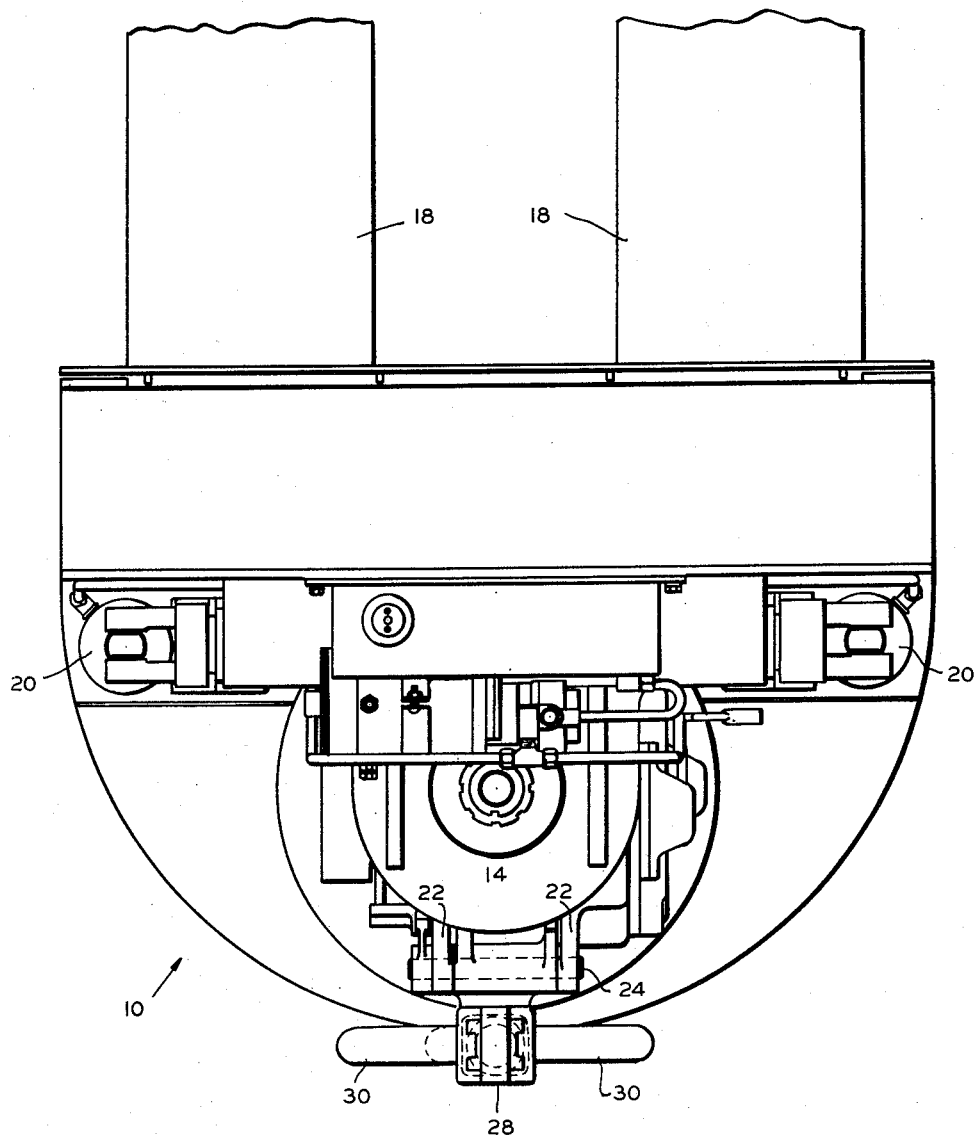
Figure 2 is a partial plan view of the hand lift truck of Figure 1 with covers removed to reveal the drive head.

Referring now to the drawings, there is indicated generally by the reference numeral 10 a hand lift truck which comprises a body portion 12 in which is rotatably mounted, about a vertical axis, drive head means 14 supported on a drive wheel 16. Projecting forwardly from the body portion 12 of the truck 10 is load supporting means 18 which, in the specific embodiment shown, includes a pair of horizontal fork frames vertically movable relative to the body portion 12 through the actuation of hydraulic piston and cylinder assemblies 20 (see Fig. 2) one arranged at each side of the truck 10. The load supporting forks 18 at their forward ends are supported on rollers 21 in a manner which is well known in the art.

The rotatable drive head 14, at the front portion thereof, is formed with an upwardly projecting bracket member having spaced legs 22 which provide support for a horizontal pin member 24. The pin member 24 has secured thereon the lower end of a normally upwardly extending steering handle 26 which has a control head 28 at its upper end with hand grips 30 extending laterally therefrom.

Figure 1:
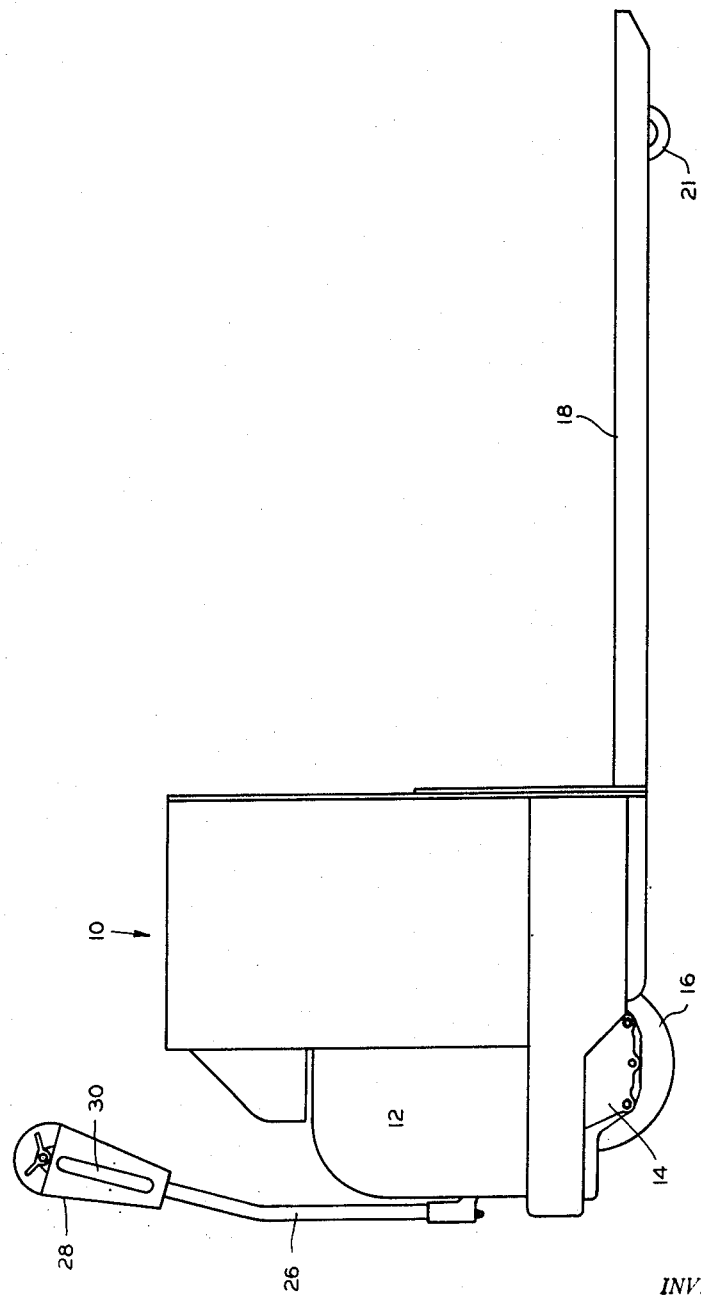
Figure 1 is a side elevational view of a hand lift truck embodying the principles of our invention.

The handle 26 may be swung in a vertical plane from the vertical position shown in Figure 1 to a substantially horizontal position. However, it is normally desirable to maintain the handle 26 in a substantially vertical position, as shown, and, therefore, suitable means is provided for biasing the handle toward a vertical position. The biasing means comprises resilient means in the form of a coil spring 32 which is secured at its lower end to the bracket member 34 of the rotatable drive frame 14. The spring 32 at its upper end is secured to a cam member 36 which is mounted for pivotal movement with the handle 26 on the pivotal axis of the latter about the pin member 24. It is to be observed that the cam surface 38 of the cam 36 curves inwardly in a direction toward the axis of the pin member 24 and, therefore, as the handle 26 is swung downwardly from a vertical position and the spring 32 is extended, the axis of the spring 32 moves toward the axis of the pin 24. Thus, although the force exerted by the spring 32 increases as the handle is moved downwardly, the lever arm, through which the force of the spring 32 acts, decreases, and therefore the overall force exerted on the handle 26 remains substantially uniform irrespective of the position of the latter in the plane of swinging movement.

As shown in Figure 4, the drive wheel 16 of the hand truck 10 is powered by an electric motor indicated at 40. The electric motor includes a horizontal output or armature shaft 42 which is adapted to have driving connection with the drive wheel 16 through suitable gearing (not shown). Secured to one end of the armature shaft 42 of the motor 40 is a brake wheel or drum 44 which has associated therewith a pair of brake shoes 46. The brake shoes 46 are mounted at either side of the brake drum 44 and are pivotally secured at 47 to levers 48 which, at their upper ends, are pivotally mounted at 50 to the rotatable head 14 of the hand truck 10. A spring 52 is provided for normally urging the lower ends of the levers 48 toward one another so as to apply a braking force to the brake drum 44 through the brake shoes 46.

A rotatable cam 54, is employed for effecting spreading of the cam followers 56 which are adjustably secured in the lower ends of the levers 48. In addition, one of the brake actuating levers 48 at its lower end is adapted to effect opening and closing of a control switch 58 which is physically mounted to the rotatable head 14 and has electrical connection in the circuit of the motor 40.

The cam 54 is adapted to be rotated by means of the aforedescribed steering handle 26. The cam 54 has connection through a lever 59 and a link 60 which, as shown in Figure 4, are moved by a lever 62 mounted on the pin member 24 for pivotal movement with the handle 26.

With the handle 26 in the vertical position shown in the drawings, and the cam 54 positioned as shown, the brake spring 52 is free to urge the brake shoes 46 into engagement with the brake drum 44 for holding the motor output shaft 42 against rotation. At this same time, the electrical switch 58 is open and the electrical circuit of the motor 40 is interrupted. As the handle 26 is swung downwardly from a vertical position toward a horizontal position, the cam 54 is rotated and the cam followers 56, together with the levers 48 and brake shoes 46, are spread apart, as is apparent from a consideration of Figure 4, thereby releasing the brake drum 44 for rotation and simultaneously closing the switch 58 for permitting current to be delivered to the electric motor 40.

The truck 10 may now be driven to any location through suitable actuation of the controls located on the control head 28 at the upper end of the steering handle 26, and the truck may be steered by swinging the handle 26 laterally for effecting rotary movement of the head 14 about its vertical mounting in the body portion 12 of the truck 10. The linkage mechanism between the lower end of the steering handle 26 and the brake actuating cam 54 is arranged so that when the handle 26 is disposed in a horizontal position the cam 54 permits the spring 52 to force the brake shoes 46 into engagement with the brake drum 44 for braking the output shaft 42 and simultaneously effecting opening of the switch 58 and the electrical circuit of the drive motor 40, the same as when the handle is vertical. At this point, the cam 54 and the followers 56, in effect, releasably lock the steering handle 26 in a horizontal position.

Now it will be readily appreciated that if the spring 32 were made strong enough to break this hold of the cam 54, the handle 26 would tend to return too quickly to a vertical position and would perhaps cause injury to the operator of the truck. Consequently, to overcome the hold of cam 54 of the linkage mechanism when the handle is horizontal a supplementary resilient means in the form of a spring 64 is secured to the rotatable drive head 14. The spring 64 is arranged with a free end that is adapted to be engaged by the lower end 66 of the handle 26 when the latter is in a generally horizontal position. A projection 67 on the lower end of the handle extends into the free end of spring 64 and maintains correct alignment of spring 64 when handle 26 is disposed in a horizontal position and the spring 64 is compressed. The spring 64 together with the spring 32, serves to break the combined hold of the cam 54 and of the spring 52 thereby initially biasing the handle 26 away from the horizontal, after which the sole force of spring 32 is sufficient for completing return of the handle to a vertical position.

Now, while we have shown and described what we believe to be a preferred embodiment of our present invention, it will be understood that various rearrangements and modifications may be made therein without departing from the spirit and scope of our present invention.

We claim:

1. For use in a hand lift truck having a drive head and a prime mover including brake means therefor, a handle pivotally mounted to said drive head for swinging movement in a vertical plane, linkage means extending between and having connection with said handle and said brake means for applying and holding the latter when said handle is horizontal, resilient means carried by said head and having a free end engageable by said handle when the latter is disposed horizontally, said resilient means tending to initially bias said handle away from the horizontal, and connecting means extending between and having connection with said head and said handle for biasing the latter to a vertical position, said resilient means and said connecting means being together effective to break the hold of said linkage means on said brake means and said connecting means being arranged to exert a substantially uniform biasing force on said handle irrespective of the position of the latter in the plane of swinging movement.

2. For use in a hand lift truck having a drive head and a prime mover including brake means therefor, a handle pivotally mounted to said drive head for swinging movement in a vertical plane, linkage means extending between and having connection with said handle and said brake means for applying and holding the latter when said handle is horizontal, first resilient means carried by said drive head and having a free end engageable by said handle when the latter is disposed horizontally, said first resilient means tending to initially bias said handle away from the horizontal, cam means mounted for pivotal movement with said handle on the pivotal axis thereof, second resilient means having connection at one end with said drive head and at the other end with said cam means for biasing said handle to a vertical position, said first and second resilient means being together effective to break the hold of said brake means and the connection between said second resilient means and said cam means being arranged so that the axis of said second resilient means moves toward the pivotal axis of said handle as the latter is swung away from the vertical for maintaining a substantially uniform biasing force on said handle irrespective of the position of the latter in the plane of swinging movement.

3. For use in a hand lift truck having a drive head and a prime mover including brake means therefor, a handle pivotally mounted to said drive head for swinging movement in a vertical plane, linkage means extending between and having connection with said handle and said brake means for applying and holding the latter when said handle is horizontal, resilient means carried by said head and having a free end engageable by said handle when the latter is disposed horizontally, said resilient means tending to initially bias said handle away from the horizontal, and connecting means extending between and having connection with said head and said handle for biasing the latter to a vertical position, said resilient means and said connecting means being together effective to break the hold of said linkage means on said brake means.

References Cited in the file of this patent

UNITED STATES PATENTS

| | | |
|---|---|---|
| 2,170,744 | Adler | Aug. 22, 1939 |
| 2,178,122 | Ostler | Oct. 31, 1939 |
| 2,300,378 | Fageol et al. | Oct. 27, 1942 |
| 2,592,091 | Weaver | Apr. 8, 1952 |
| 2,645,297 | Wennberg et al. | July 14, 1953 |